Dec. 12, 1939.  E. J. SCOTT  2,183,508

MACHINE FOR SHAPING RUBBER MATS AND THE LIKE

Filed Nov. 4, 1937   4 Sheets-Sheet 1

Inventor
E. J. SCOTT
by Kenway & Witter
Attorneys

Dec. 12, 1939.                 E. J. SCOTT                    2,183,508
                MACHINE FOR SHAPING RUBBER MATS AND THE LIKE
                    Filed Nov. 4, 1937           4 Sheets-Sheet 2
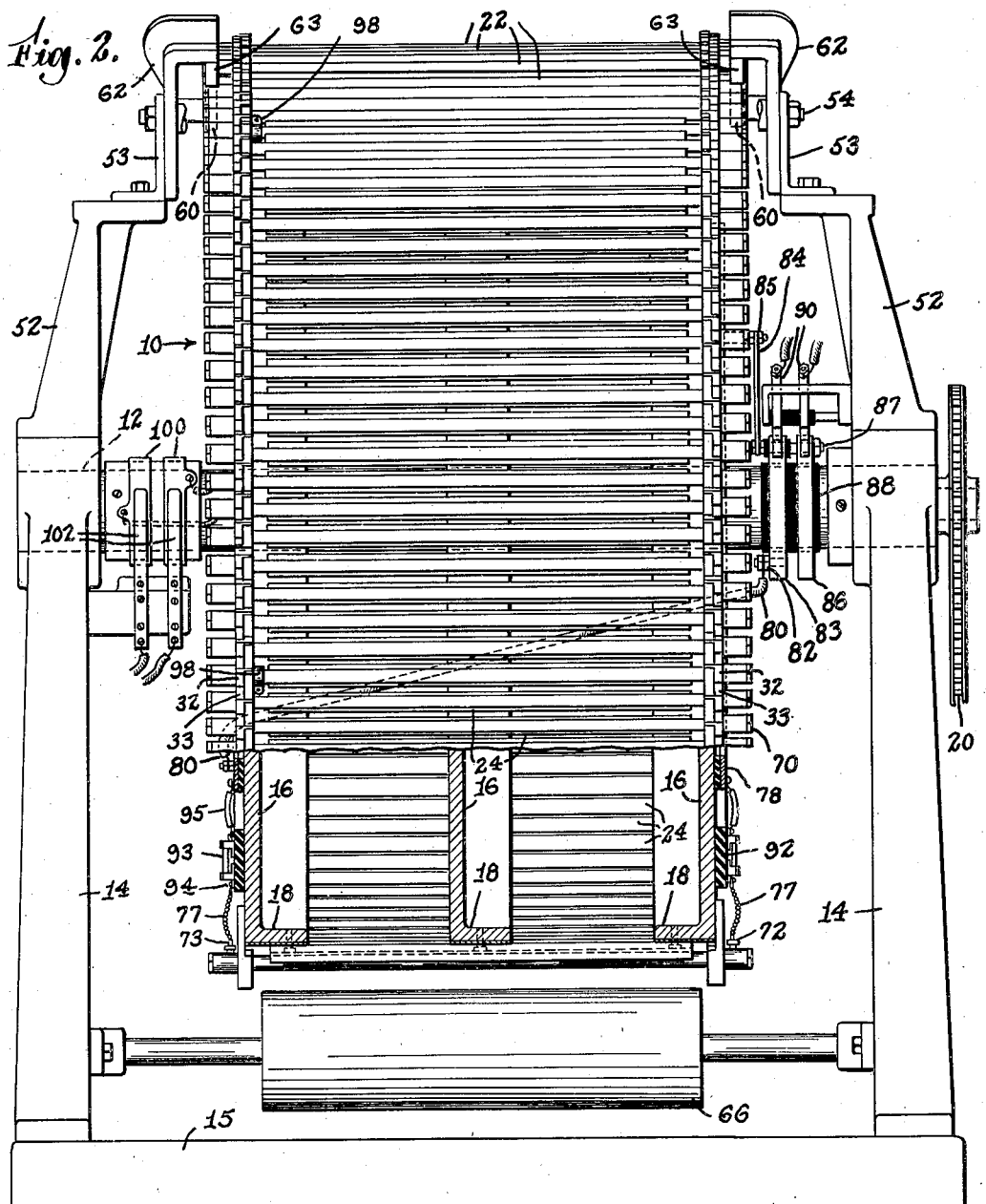
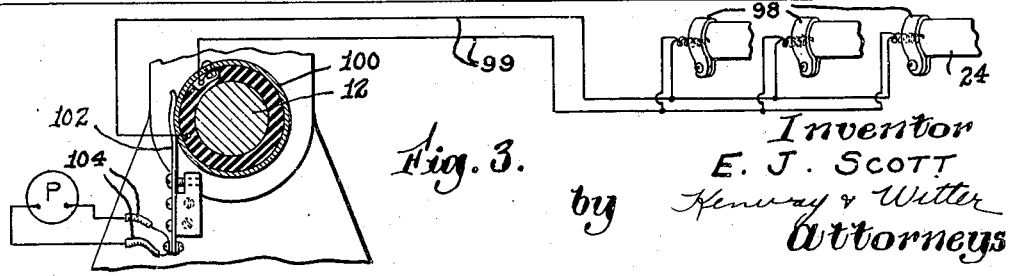
Inventor
E. J. Scott
by Henry & Witter
Attorneys

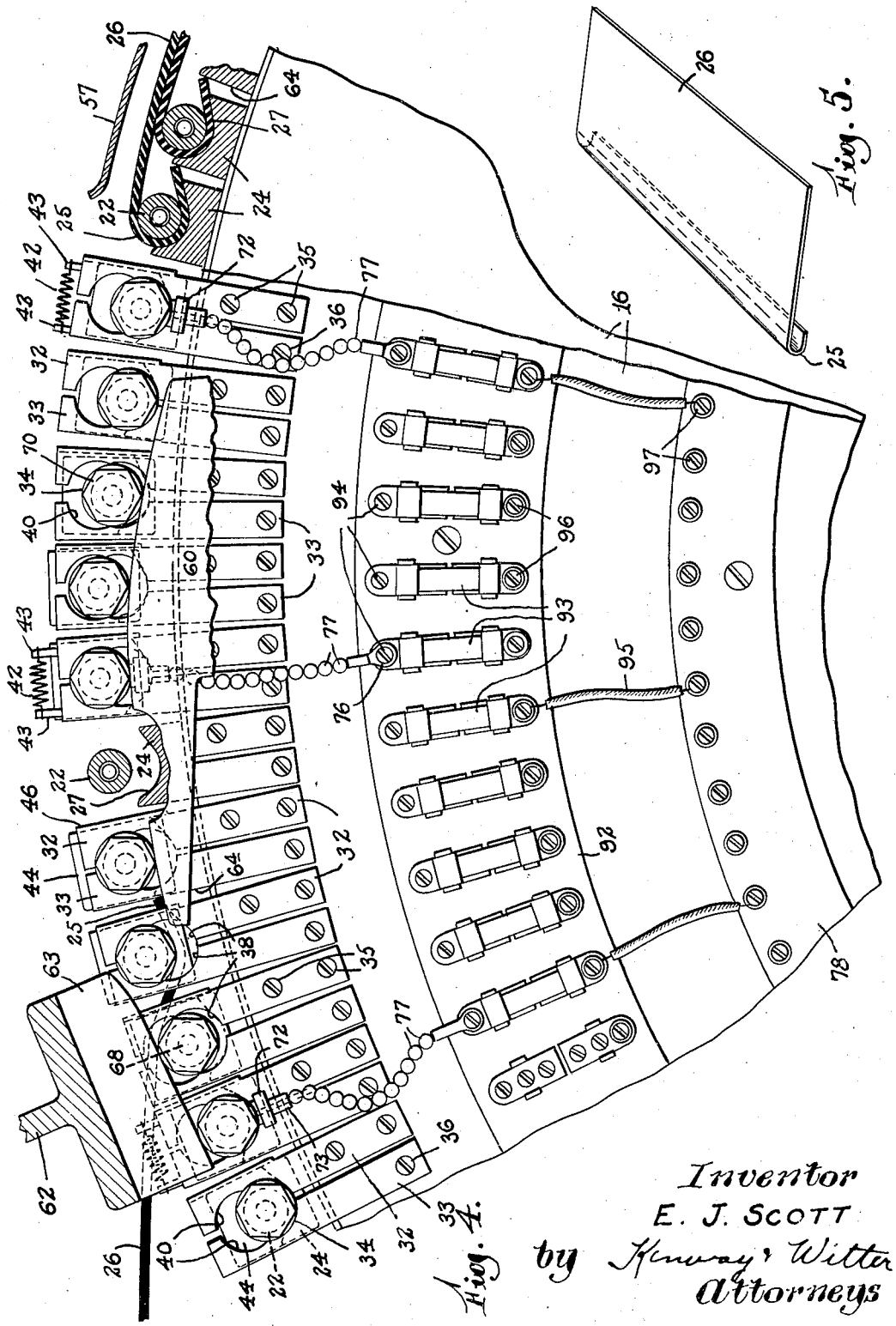

Dec. 12, 1939.  E. J. SCOTT  2,183,508
MACHINE FOR SHAPING RUBBER MATS AND THE LIKE
Filed Nov. 4, 1937  4 Sheets-Sheet 4
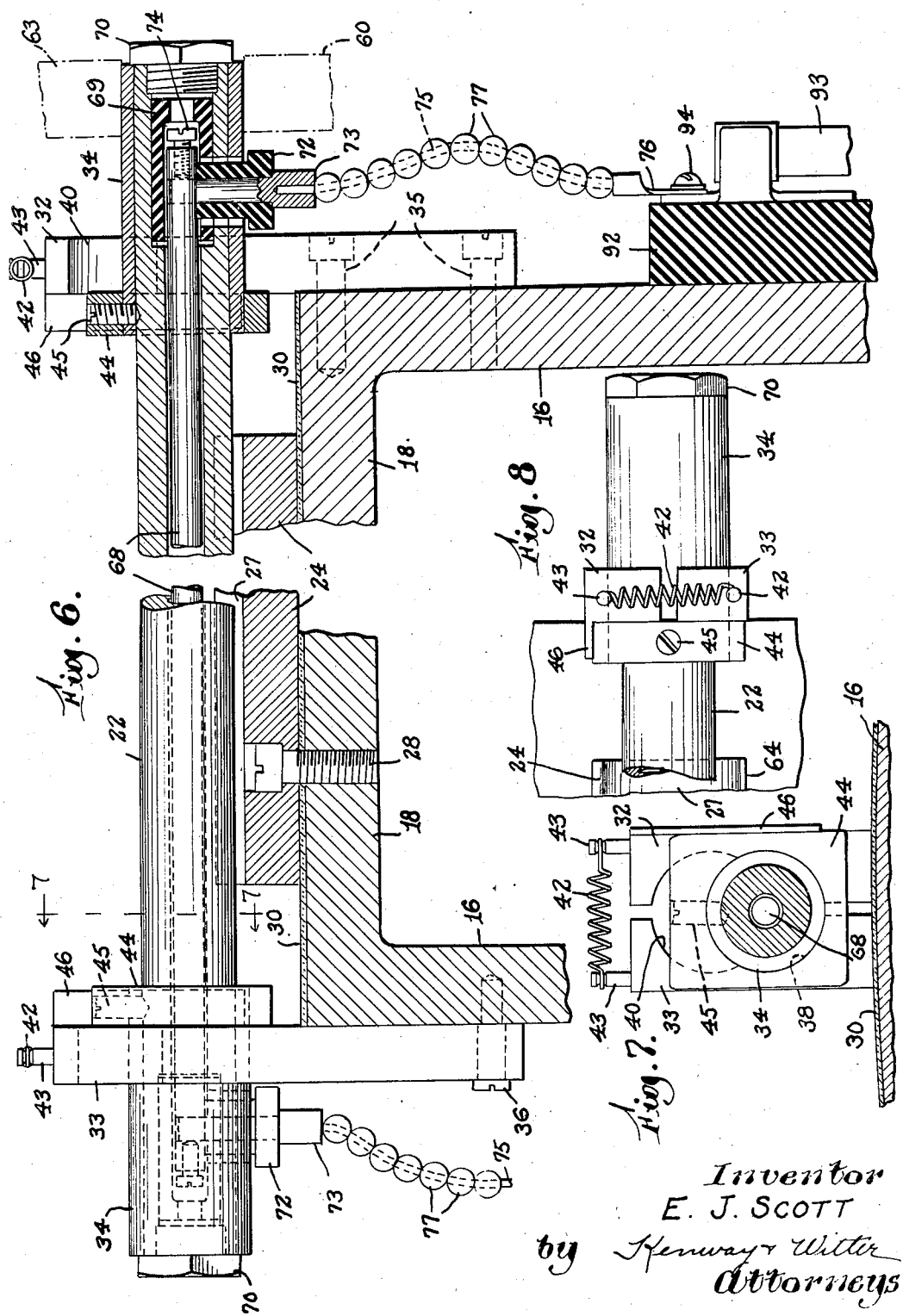
Inventor
E. J. Scott
by Kenway & Witter
Attorneys Patented Dec. 12, 1939

2,183,508

UNITED STATES PATENT OFFICE 2,183,508

MACHINE FOR SHAPING RUBBER MATS AND THE LIKE

Ephriam J. Scott, Somerville, Mass., assignor to Boston Woven Hose & Rubber Company, Cambridge, Mass., a corporation of Massachusetts Application November 4, 1937, Serial No. 172,763

8 Claims. (Cl. 18—21)

This invention relates to a machine for shaping rubber mats and the like and more particularly for permanently curving one edge portion of rubber stair treads. Such mats or treads of the nature shown in McKay Design Patent No. 104,792 are used in very substantial numbers and the manufacture of such mats has been greatly facilitated by the employment of a novel method disclosed in Bierer Patent No. 2,077,508. Heretofore, however, the curving of one edge portion of the mat has been most commonly effected by a manually operated process employing heated rods or cores on which the mats are hung and about which they are held in curved condition during the curving treatment. The primary object of my invention herein is the production of a novel machine for continuously and permanently curving a large number of these mats simultaneously.

In accordance with my invention, I mount a plurality of core members together with cooperating mold members for movement along a predetermined path, preferably on a revolving drum or the like, and provide means for separating the members to a mat removing and receiving position at one portion of the path and for thereafter closing the members to a position engaging the mats therebetween. Heat from any suitable source is directed to one or both members, preferably to the core members, whereby the mats are permanently set to shape during their passage through said path. A further object of the invention resides in the production of a novel machine of this nature adapted thus to treat a plurality of mats simultaneously, the operator being required only to place the mats on the cores and remove the finished mats therefrom.

These and other features of the invention will be best understood and appreciated from the following description of one embodiment thereof, selected for purposes of illustration and shown in the accompanying drawings, wherein:

Fig. 2 is a front elevation thereof, partially broken away,

Figure 1:
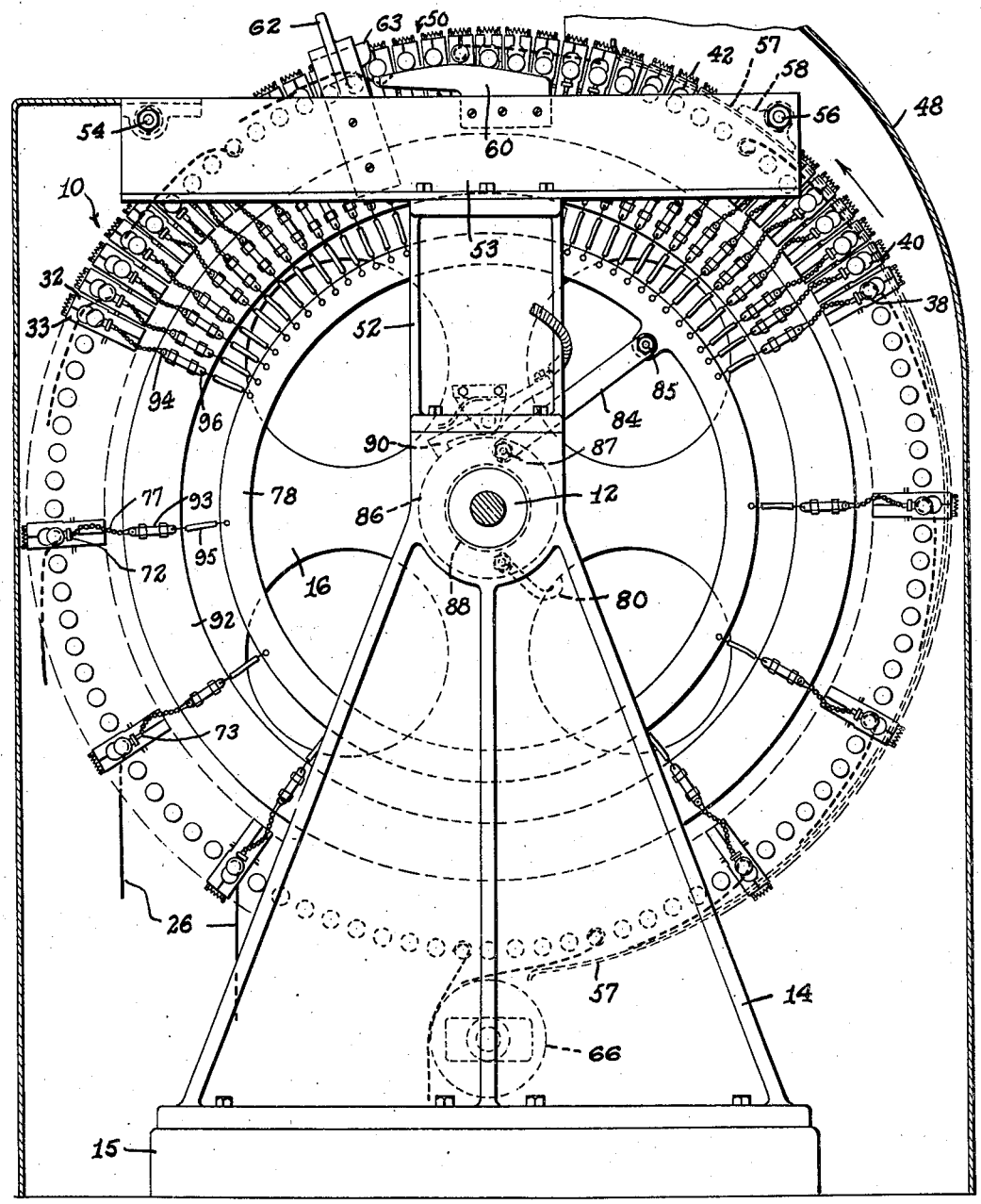
Fig. 1 is a partial side elevation of a machine embodying my invention.

Fig. 3 is a diagrammatic view of wiring connections from the heated molding cores to a pyrometer, Fig. 4 is an enlarged fragmentary view showing a plurality of the cores and molds in elevation and section, Fig. 5 is a perspective view of a mat which has been treated by the machine, Fig. 6 is an enlarged fragmentary view showing one of the molding units in side elevation and in section, Fig. 7 is a sectional view taken on line 7—7 of Fig. 6, and Fig. 8 is a top plan view of the right hand end of the unit illustrated in Fig. 6.

In the drawings, 10 indicates a drum or the like fixed to a shaft 12 rotatably supported at its ends in uprights 14 mounted on a base 15. The drum illustrated comprises discs 16 having flanged peripheral portions 18. Driving connections including a sprocket wheel on the shaft 12 and a chain 20 are provided for slowly rotating the drum in the direction of the arrow.

Carried on and arranged in relatively spaced relation about the periphery of the drum are a plurality of mat-shaping units, each unit comprising a core member 22 and a cooperating mold 24 arranged to engage an edge portion 25 of a mat 26 therebetween. The cooperating cores and molds are mounted to have a relative separating and closing movement, whereby respectively permitting the feeding of a mat therebetween and causing the mold to hold the mat in close surface contact with the core and, while I have herein illustrated the molds as fixed and the cores as movable, it will be understood that the reverse or other suitable mounting of these elements is within the scope of the invention.

Each mold 24 comprises a relatively long block rectangular in cross section except that its outer face is recessed to provide an outwardly facing concave surface 27 extending longitudinally of the block. The molds are mounted on the flanges 18 in relatively spaced relation about the drum, bolts 28 securing the molds to the flanges and suitable heat insulation 30 being provided between the molds and flanges.

The core members 22 are preferably and conveniently in the form of tubular rods having curved convex surfaces cooperating with the concave surfaces 27 of the molds 24, and are supported on the drum respectively outward of the molds by pairs of clamping jaws 32—33 carried by the two outermost discs 16 and engaged sleeves 34 mounted on the ends of the rods. Each pair of jaws comprises a jaw 32 immovably fixed to one of the discs by screw 35 and a cooperating jaw 33 pivoted to the disc at 36. The jaws extend radially outward beyond the periphery of the drum and their opposing faces are recessed at 38 and 40 to receive the sleeves 34 therebetween. When the sleeves of a rod are engaged within the recesses 38 to rod is held closely adjacent to the surface 27 of the cooperating mold 24 and when the sleeves are engaged within the recesses 40 the rod is held in spaced relation radially outward of the mold. Springs 42 connected to pins 43 on the free ends of the jaws normally draw the jaws into clamping engagement with the sleeves. Rectangular collars 44 secured by set screws 45 to the sleeves and rods adjacent to the inner faces of the jaws prevent endwise movement of the sleeves and rods, and flanges 46 carried by the fixed jaws 32 and overlapping side walls of the collars prevent rotation of the sleeves and rods.

The drum may be substantially enclosed within a hood 48, one portion of the drum at the top 50 thereof, however, being exposed for loading and unloading the work pieces 26. The drum is rotated slowly in the direction of the arrow and, during passage of the units from the position 50 through the hood and back to the position 50, the work pieces are gripped between the elements 22 and 24. As each unit reaches the position 50 it is necessary to separate the elements 22 and 24 to permit removal of the finished work pieces and the insertion of other pieces. Likewise, when such other work pieces 26 to be curved are placed between these elements it is necessary to bring the elements into gripping relation with the work pieces before the units pass into the hood 48. While these separating and gripping movements may be performed manually or in any convenient manner, I preferably perform the same automatically by means of cams as follows.

Mounted on each upright 14 is a bracket 52 and supported on each such bracket is a relatively long angle plate 53. A tie rod 54 connects the two plates at one end thereof and the hood 48 is anchored to this rod. A tie rod 56 connects the two plates at their other ends. This rod 56 also serves as a support for an inner hood or shield 57, extending around the right hand half of the drum (Fig. 1) closely adjacent to the cores 22 and of a width spanning the gap between the collars 44, elements 58 serving to support this hood on the rod.

Mounted on each plate 53 is a cam member 60, these two members 60 having outwardly facing cam surfaces located in alignment with the sleeves 34. The arrangement is such that as the mold units pass into the gap 50 the sleeves ride up the inclined portions of the cams, whereupon the core rods 22 are forced outwardly from the jaw recesses 38 to the jaw recesses 40. The finished work pieces may thereupon be removed and other pieces placed between the elements 22 and 24. Mounted on each plate 53 beyond the cams 60 is a bracket 62 and these brackets have inwardly facing cams 63 also located in alignment with the sleeves 34. The arrangement is such that as the mold units pass from the work loading position the sleeves ride down the inclined portions of these cams, whereupon the core rods 22 are forced inwardly from the jaw recesses 40 to the jaw recesses 38 in which position the work pieces are gripped between the elements 22 and 24. The sleeves 34 will be hardened to a degree preventing substantial wear thereof by engagement with the cams.

The loading of a mat into the open mold is illustrated in Fig. 4, it being noted that the front edge 64 of each mold block 24 serves as a gauging stop for the edge of the mat as it is inserted into the molding unit. The jaws 32 and 33 hold the mat gripped between the elements 22 and 24 during its passage around the drum and during which the edge portion 25 of the mat is permanently curved to the shape of the core. During their passage downwardly with the left hand side of the drum (Fig. 1), the mats are allowed to hang freely downwardly by gravity. A relatively long and freely rotatable roll 66 is positioned adjacent to the bottom of the drum and the lower end of the inner hood 57 is closely adjacent to this roll. As the mats reach the bottom of the drum their free hanging portions engage this roll and are lifted thereby upwardly into overlapping relation, such movement curving a further area of each mat edge portion 25 onto its core 22. The overlapping mats pass from the roll 66 immediately into the hood 57 which thereafter holds the mats in this relation during the remainder of their travel with the drum. It will be apparent that the heat applied to the area 25 of each mat during its downward travel with the drum renders the same sufficiently plastic to adapt it readily to take this further curving treatment at the bottom of the drum. It will also be apparent that the hood 57 and the overlapping mats serve to insulate the units against the escape of heat during the final setting of the curved edges 25.

One or both molding elements 22—24 may be heated in any suitable and convenient manner, as by steam or electricity. In the drawings, I have illustrated the same as heated electrically. Each such core is of tubular construction and extending through the bore of each is a heating rod 68 including a resistance coil therein. This rod is supported at its ends in bushings 69 fitted into counter-bores in the ends of the core, threaded plugs 70 serving to close the open ends of the core. Extending transversely through each sleeve 34 and the core 22 and into the bushing 69 is a bushing 72, the bushings 69 and 72 being of porcelain or other insulating material. Extending through each bushing 72 and into the heating rod 68 is a conductor plug 73, this plug being held within the rod and in contact with the heating coil therein by a set screw 74. Connected to and depending from each plug 73 at each end of the core 22 is a conductor cable 75 having a connecting element 76 on its inner end and each cable is preferably protected by beads 77 or other suitable covering permitting free flexing of the cables.

Mounted respectively on the two ends of the drum are two conductor rings 78. A cable 80 connected to one of these rings passes through the drum and is connected at 82 to a collector ring 83 carried on the inner enlarged portion of the shaft 12. A conductor bar 84 has one end connected at 85 to the other ring 78 and the other end of the bar is connected to a collector ring 86 by means of a conductor rod 87 passing through and insulated from the ring 83, the collector rings 83 and 86 being insulated from the shaft by insulation material 88. Brushes 90 bearing on the collector rings serve to conduct electrical energy thereto from any suitable source.

Carried on each end of the drum and radially spaced outwardly from the ring 78 is a ring 92 of insulation material and mounted on this ring are a plurality of fuses 93, one for each conductor cable 75. The cable ends 76 are respectively connected to the outer terminals 94 of the fuses and wires 95 connect the inner terminals 96 thereof to the ring 78 at 97. The rings 78 are insulated from the drum by insulation material as illustrated in Fig. 2. It will be apparent that the circuits above described conduct electrical energy to the heating rods 68 whereby to heat the cores 22 and that the fuses 93 serve to protect each heating unit individually.

The degree of heat applied to the mats during the curving treatment thereof is of importance and the following described means is provided for controlling the heat of the cores 22. Cooperating with three of the cores, widely spaced about the drum, and adjacent to one end thereof are provided thermocouples held in close contact with the cores by clamping collars 98. Wires 99 connect the thermo-couples with collector rings 100 mounted on and insulated from the shaft 12. Brushes 102 are in contact with these rings and wires 104 connect the brushes to an instrument P for indicating the temperature of the cores or for automatically controlling the heating thereof through a control of the electric energy passing through the brushes 90 and to the heating elements. The specific details of this temperature indicating or controlling mechanism are not a part of the invention herein and need not therefore be further described.

The operation of the machine may be briefly described as follows: The drum 10 is rotated slowly and continuously in the direction of the arrow and heat is continuously supplied to the cores 22 through the electric circuits above described. The major peripheral portion of the drum is enclosed within the hood 48 and the right hand half thereof (Fig. 1) is enclosed within the inner hood 57, the molding elements 22—24 being in work-gripping relation when located within the hoods. As the molding units leave the hoods and pass into the gap 50 at the top of the drum the sleeves 34 on the ends of the cores 22 ride up the inclined portions of the cam plates 60 which thereupon force the cores radially outward from the jaw recesses 38 to the jaw recesses 40. The finished mats which have then completed their passage through the machine are thereupon removed and other mats to be treated are placed between the elements 22 and 24 of the molding units (Fig. 4). Continuing rotation of the drum passes the sleeves 34 into contact with the cams 63 which thereupon force the cores radially inward and the sleeves into the jaw recesses 38. In such position of the parts the curved concave surface 27 of each mold 24 holds the edge portion 25 of the mat in close contact with the adjacent curved convex surface of the core 22 and this position is maintained during passage of the mats through the machine and back to the gap 50. The mats are allowed to hang freely by gravity during their passage downwardly with and along the left hand side of the drum (Fig. 1). The free hanging portions of the mats engage the roll 66 at the bottom of the drum and are wrapped further about the cores 22 and brought into overlapping relation and are held in such position by gravity and the hood 57 during their passage through the hood. It will be noted that the cylindrical outer surface 22 of each core member provides in effect a molding surface facing outwardly of the drum and forming a continuation of the surface thereof which cooperates with the adjacent mold 24, this outwardly facing molding surface being adapted to receive in wrapped surface contact thereagainst a further portion of a mat gripped between the mold and core member as the drum is rotated, as illustrated in Fig. 1. When the mats reach the gap 50 they are removed as the cams 60 separate the molding surfaces 22 and 27. Such passage through the machine permanently curves an edge portion 25 of each mat as illustrated in Fig. 5. It will be apparent that a large number of mats are thus being treated simultaneously and uniformly and that the operator is required only to remove the finished mats and feed other mats into the molding units.

Having thus described my invention, what I claim as new and desire to secure by United States Letters Patent is:

1. A machine for curving the ends of rubber mats and the like, comprising a drum arranged to rotate on a horizontal axis a plurality of heated molds disposed in spaced relation about the periphery of the drum and having curved surfaces for clamping one margin of each mat, the remaining portion of each mat being allowed to hang down freely from the molds during the first part of the curving operation thereon, and means for placing and retaining the hanging mats in overlapping relation against the drum during a further part of the molding operation as the drum rotates whereby curving a further area of each mat.

2. A machine for curving the ends of rubber mats and the like, comprising a drum arranged to rotate on a horizontal axis, a plurality of cooperating molds disposed in spaced relation about the periphery of the drum and each having curved surfaces for clamping one margin of a mat, automatic means for opening and closing said molds at predetermined positions of drum rotation, and a curved shield disposed about one portion of the drum for holding the mats in overlapping contact against the drum.

3. A machine for curving the ends of rubber mats and the like, comprising a drum arranged to rotate on a horizontal axis, a plurality of cooperating molds disposed in spaced relation about the periphery of the drum and having curved surfaces for clamping one margin of each mat, the remaining portions of the mats being permitted to hang down freely, means for heating the molds, a roller parallel with the molds at the bottom of the drum, and a shield disposed about a substantial portion of the drum adjacent to the roller, the roller and shield serving to place and retain the mats in overlapping relation about the drum during the latter portion of the molding operation.

4. A machine for shaping rubber mats and the like, comprising a drum mounted to rotate on a horizontal axis, a series of oblong core members mounted in spaced relation about the periphery of the drum, a series of cooperating oblong mold members arranged in like manner and adapted respectively to grip and shape articles against the core members, electric heating elements within the core members, means providing an independent circuit through each of said elements and including a fuse for protecting each of said elements, a ring carried by the drum inwardly of the core members and supporting the fuses, and means for moving the members of one series out of and into article gripping relation with the members of the other series at predetermined positions in the drum rotation.

5. A machine for shaping rubber mats and the like, comprising a drum mounted to rotate about a horizontal axis, a series of oblong shaping units arranged in spaced relation on and about the periphery of the drum and parallel with said axis, each unit embodying an oblong element having a transversely curved concave surface and an oblong core member supported on the drum adjacent to its ends and having a transversely curved convex surface intermediate of said ends and opposed to said concave surface, the concave and convex surfaces of each unit being adapted to grip an article to be shaped therebetween and each of said elements having an elongated opening therealong permitting the mat to extend therethrough, means for heating one of said surfaces of each unit, two pairs of jaws respectively engaging the ends of each core member, said jaws having inner and outer recesses for receiving the core member and permitting movement thereof to inner and outer positions radially of the drum, and means acting on the core members to move them into and from article gripping position relative to the oblong elements as the units pass predetermined positions upon rotation of the drum.

6. A machine for shaping the ends of rubber mats and the like, comprising a plurality of oblong core members, a rotary drum, means supporting the members in lateral spaced relation on the drum and about the rotary axis of the drum, the members extending in a direction parallel to the axis of the drum, a plurality of oblong molds carried by the drum between the core members and the rotary axis of the drum, there being one mold for each core member and each mold having an open and outwardly facing molding surface of a contour corresponding to the adjacent contour of the adjacent core member and each core member and mold being adapted to receive therebetween at one portion of the path the end of a mat to be shaped, means for causing a relative approaching movement between each core member and its cooperating mold to engage the mat in surface contact therebetween, and means for heating a mat contacting surface of each such core member-mold contact.

7. The machine defined in claim 6 in which each cooperating core member and mold is arranged to grip one margin portion of a mat therebetween and in which each core member has a molding surface facing outwardly of the drum and forming a continuation of the surface thereof which cooperates with the adjacent mold, the said molding surface being adapted to receive in wrapped surface contact thereagainst a further portion of a mat gripped between the mold and core member.

8. The machine defined in claim 6 in which the core members are supported at their ends and the cooperating portions of the molds are located between such supports, and wherein the second-named means automatically causes the core members to approach the molds at one point of the drum rotation, and means for automatically causing separating movement of the core members relative to the molds at another point of the drum rotation.

EPHRIAM J. SCOTT.